United States Patent Office 3,007,951
Patented Nov. 7, 1961

3,007,951
17α-ACETYL-Δ$^{1,4}$-ANDROSTADIENE-11β,17β-DIOL-3-ONE AND PREPARATION THEREOF
Georges Muller, Nogent-sur-Marne, and Milutin Stefanovic, Paris, France, assignors to Les Laboratoires Francais de Chimiotherapie, Paris, France, a corporation of France
No Drawing. Filed June 16, 1959, Ser. No. 820,601
Claims priority, application France July 8, 1958
2 Claims. (Cl. 260—397.45)

The present invention relates to a new cyclopentanopolyhydrophenanthrene compound and more particularly to 17α-acetyl-Δ$^{1,4}$-androstadiene-11β,17β-diol-3-one, and to a process of making same.

It is one object of the present invention to provide a simple and effective process of preparing 17α-acetyl-Δ$^{1,4}$-androstadiene-11β,17β-diol-3-one.

Another object of the present invention is to provide the new and valuable 17α-acetyl-Δ$^{1,4}$-androstadiene-11β, 17β-diol-3-one which compound has useful properties.

Other objects of the present invention and advantageous features thereof will become apparent as the description proceeds.

17α - acetyl - Δ$^{1,4}$ - androstadiene - 11β,17β - diol-3-one of the formula

Melting point: 196°–197° C.

is a valuable intermediate in the manufacture of therapeutic substances and has itself particular pharmacodynamic properties.

Said compound of Formula I is prepared according to the present invention by adding one molecule of water to 17α - ethynyl - Δ$^{1,4}$ - androstadiene - 11β,17β - diol-3-one of Formula II:

Said hydration reaction is preferably effected in the presence of the mercury salt of p-toluene sulfonamide.

The 17α - ethynyl - Δ$^{1,4}$ - androstadiene - 11β,17β-diol-3-one used as starting material is prepared by condensing Δ$^{1,4}$-androstadiene-3,11,17-trione with acetylene in the presence of alcoholates or amides of alkali metals or alkaline earth metals, such as the potassium, lithium, or calcium alcoholates or amides in an inert solvent. Condensation with acetylene may also be effected in the presence of liquid ammonia, whereby on addition of the alkali or alkaline earth metals the metal amides are produced in situ. After acetylene addition is completed, the reaction mixture is acidified and 11-keto-17α-ethynyl-Δ$^{1,4}$-androstadieneolone is extracted by means of a solvent and purified by recrystallization. In order to obtain the corresponding 11β-hydroxylated compound, the 3-monosemicarbazone of said 3,11-diketone is formed and is reduced in a solvent, preferably in aqueous tetrahydrofuran.

According to the present invention the compound of Formula I is prepared by boiling the ethynyl compound of Formula II in alcoholic solution in the presence of the mercury salt of p-toluene sulfonamide which acts as a catalyst. After cooling, the desired steroid compound of Formula I is isolated.

The following examples serve to illustrate the present invention without, however, limiting the same thereto.

The melting points given in said examples are instantaneous melting points, determined on the Maquenne block.

EXAMPLE 1

Preparation of 17α-acetyl-Δ$^{1,4}$-androstadiene-11β,17β-diol-3-one of Formula I 2 g. of 17α-ethynyl-Δ$^{1,4}$-androstadiene-11β,17β-diol-3-one of Formula II, are refluxed in 200 cc. of 95% alcohol which contains 2 g. of the mercury salt of p-toluene sulfonamide. Heating under reflux is continued with stirring for 8 hours. After cooling, the catalyst is filtered off and is extracted successively with alcohol, methylene chloride, and ethyl acetate. The crude compound of Formula I is obtained by distilling to dryness the combined extracts and alcoholic filtrate. Said crude compound is dissolved in ethyl acetate, treated with animal charcoal, and filtered. On distilling the filtrate to dryness, 1 g. of the compound of Formula I is obtained. Its melting point, on recrystallization from ethyl acetate, is 196–197° C.; its optical rotation $[\alpha]_D^{20}=+64°\pm5°$ (concentration: 0.5% in chloroform). The compound is soluble in alcohol, acetone, chloroform, and ethyl acetate, sparingly soluble in benzene or ether, and insoluble in water and dilute aqueous acids or alkalies.

Analysis.—$C_{21}H_{28}O_4$; molecular weight: 344.4. Calculated: 73.22% C; 8.19% H; 18.58% O. Found: 73.4% C.; 8.1% H; 18.9% O.

This compound has not been previously described in the literature.

EXAMPLE 2

On heating 200 mg. of said compound of Formula I to 200° C. for 5 minutes, 126 mg. (corresponding to a yield of 63%) of 17α-methyl-Δ$^{1,4}$-D-homoandrostadiene-11β,17β-diol-3,17α-dione are obtained. Its melting point is 225° C. and its optical rotation $[\alpha]_D^{20}=+32°\pm5°$ (concentration: 0.5% in chloroform).

This compound, which has not been previously described in the literature, is obtained in the form of colorless crystals, soluble in alcohol, acetone, chloroform, and ethyl acetate, sparingly soluble in benzene, and insoluble in water, dilute aqueous acids and alkalies, and ether.

Analysis.—$C_{21}H_{28}O_4$; molecular weight: 344.4. Calculated: 73.22% C; 8.19% H; 18.58% O. Found: 73.0% C; 8.1% H; 18.8% O.

Its infra-red spectrum shows the presence of the D-homo ring.

EXAMPLE 3

The starting material is obtained by proceeding as follows:

A solution of 2.35 g. of Δ$^1$-dehydro adrenosterone (prepared as described in "J. Am. Chem. Soc.," vol. 77 (1955), p. 4781) in 30 cc. of dioxane is saturated with acetylene; to this solution there are added 12 cc. of a solution obtained from 9.5 g. of potassium metal, 120 cc. of tertiary amyl alcohol and 30 cc. of benzene. This addition produces a bright, brick-red color and causes formation of a reddish-brown precipitate. Purified acetylene is passed through the mixture for 2½ hours, whereupon 10 cc. of 50% acetic acid are added. The solution turns pale yellow. Precipitation is accomplished by adding 300 cc. of water and extraction is carried out with chloroform. The chloroform layer is washed with water, dried over magnesium sulfate, and filtered. The chloroform extract is treated with charcoal and is evaporated to dryness. The residue is treated with ether and filtered and washed with a very small amount of ice-cold alcohol and then with ether. After drying, 1.64 g. of an almost pure product of a very pale yellow color, having a melting point of 250–252° C. are obtained. In order to purify this product, it is dissolved in 40 cc. of absolute alcohol, the solution is concentrated to 5 cc., and the concentration is permitted to crystallize. After drying, washing the residue with ice-cold alcohol, and again drying, there are obtained 1.23 g. of the pure product, having a melting point of 253° C., and an optical rotation $[\alpha]_D^{20} = +80° \pm 2°$ (concentration: 1% in dioxane). The compound is solvated, it contains 0.7% of alcohol which it loses when heated to 135° C. It is soluble in 25 volumes of hot alcohol, in acetone, fairly well soluble in chloroform, almost insoluble in ether, and insoluble in water and in dilute aqueous acids and alkalies.

*Analysis.*—$C_{21}H_{24}O_3$; molecular weight: 324. Calculated: 77.75% C; 7.45% H. Found: 77.6% C; 7.4% H.

Upon heating to 200° C., this compound sublimates into colorless needles.

1 g. of said 11-keto-17α-ethynyl-$\Delta^{1,4}$-androstadiene-17β-ol-3-one obtained, having a melting point of 252° C., is heated at 60° C. with 60 cc. of a solution of 5% semicarbazide acetate in 90% alcohol for 14 hours. After cooling, the precipitate is filtered, the residue is washed with sold alcohol, and dried. About 1 g. of the 3-semicarbazone is obtained which is sufficiently pure for the subsequent reduction step.

0.90 g. of said semicarbozone are dissolved in a mixture of 20 cc. of tetrahydrofuran and 2 cc. of water. The solution is cooled to 5° C., and 2 g. of potassium boronhydride dissolved in 10 cc. of water are added. Two layers form rapidly. The mixture is heated to 45° C. for 4½ hours while stirring vigorously, is neutralized by adding 10 cc. of 50% acetic acid and is concentrated in a vacuum at a temperature below 50° C. A product separates which is gummy when hot and becomes pulverulent upon cooling. After washing with water and drying, 0.9 g. of a pale beige powder are obtained, constituting the crude 3-semicarbazone, which is directly hydrolyzed to 11β-hydroxy-17α-ethynyl-$\Delta^{1,4}$-androstadiene-17β-ol-3-one by heating to 90° C. for 1½ hours with 6 cc. of 50% pyruvic acid. Complete dissolution takes place and the reaction mixture is poured into an aqueous solution of sodium bicarbonate in order to neutralize the pyruvic acid. After filtering, washing with water, drying, dissolving in 2 cc. of methanol, filtering hot, and concentrating to about one-fifth of the orginal volume, 11β-hydroxy - 17α - ethynyl-$\Delta^{1,4}$-androstadiene-17β-ol-3-one is obtained, which crystallizes in big prisms of a very pale yellow color and has a melting point of 280° C. It sublimates from 250° C. on in colorless needles. It is soluble in methanol, insoluble in water, ether, and benzene. It can, moreover, be identified by its U.V. spectrum ($\lambda$ max. 244 m$\mu$; $\epsilon = 13,080$). The infra-red spectrum shown that the keto group in position 11 has disappeared while the diene ketone function 1,4 subsists.

Of course, many changes and variations in the reaction conditions, temperature and duration, in the solvents used, in the manner in which the reaction products are worked up and purified, and the like may be made by those skilled in the art in accordance with the principles set forth herein and in the claims annexed hereto.

The new 17α-acetyl-$\Delta^{1,4}$-androstadiene-11β,17β-diol-3-one as well as the 17α-methyl-$\Delta^{1,4}$-D-homoandrostadiene-11β,17β-diol-3,17α-dione according to the present invention have proved to be of great value in the treatment of hyperlipemic disease.

We claim:

1. 17α-acetyl-$\Delta^{1,4}$-androstadiene-11β,17β-diol-3-one.

2. In a process of producing 17α-acetyl-$\Delta^{1,4}$-androstadiene-11β,17β-diol-3-one, the step which comprises heating under reflux a solution of 17α-ethynyl-$\Delta^{1,4}$-androstadiene-11β,17β-diol-3-one in 95% ethanol with the addition of the mercury salt of p-toluene sulfonamide as hydrating catalyst until one mole of water is added to the ethynyl bond.

References Cited in the file of this patent

UNITED STATES PATENTS 2,767,199     Djerassi et al.     Oct. 16, 1956